(12) United States Patent
Arduini et al.

(10) Patent No.: US 10,404,097 B2
(45) Date of Patent: Sep. 3, 2019

(54) MULTI-INPUT LINE-REDUNDANT UNINTERRUPTABLE POWER SUPPLY

(71) Applicant: Cisco Technology, Inc., San Jose, CA (US)

(72) Inventors: Douglas P. Arduini, San Ramon, CA (US); Sung Kee Baek, San Ramon, CA (US); Richard Anthony O'Brien, Livermore, CA (US); John Beecroft, Camarillo, CA (US); M. Baris Dogruoz, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 15/399,765

(22) Filed: Jan. 6, 2017

(65) Prior Publication Data

US 2017/0201122 A1 Jul. 13, 2017

Related U.S. Application Data

(60) Provisional application No. 62/276,089, filed on Jan. 7, 2016.

(51) Int. Cl.
*H02J 9/06* (2006.01)
*H02M 1/00* (2006.01)
*H02M 3/04* (2006.01)
*H02M 7/04* (2006.01)

(52) U.S. Cl.
CPC ............... *H02J 9/061* (2013.01); *H02M 3/04* (2013.01); *H02M 7/04* (2013.01); *H02M 2001/007* (2013.01)

(58) Field of Classification Search
CPC ..................... H02M 2001/007; H02J 9/061
See application file for complete search history.

(56) References Cited

U.S. PATENT DOCUMENTS

| 5,939,799 A | 8/1999 | Weinstein |
| 8,391,036 B2 * | 3/2013 | Clemo ............... H02J 1/102 363/69 |
| 2014/0077602 A1 | 3/2014 | Liu et al. |
| 2015/0022003 A1* | 1/2015 | Dighrasker ......... H02M 5/42 307/65 |

(Continued)

FOREIGN PATENT DOCUMENTS

| CN | 105594312 A | 5/2016 |
| WO | 2015031104 A1 | 3/2015 |

*Primary Examiner* — Jeffrey M Shin
(74) *Attorney, Agent, or Firm* — Merchant & Gould P.C.

(57) ABSTRACT

A power supply system may comprise a plurality of input buses and an output bus. A plurality of multi-input power supplies may be disposed between the plurality of input buses and the output bus. The plurality of multi-input power supplies may be configured to supply a predetermined amount of power to the output bus before and after a failure event. The failure event may comprise at least one of the following: a failure of a one of the plurality of multi-input power supplies and loss of power on one of the plurality of input buses. Each input to the power supply may include an independent power section to support near or full output power in the event of another input power loss. Any input line loss from an independent power bus/grid may provide line redundancy to the power supply and to the power system as an Uninterruptable Power Supply.

20 Claims, 11 Drawing Sheets

(56) References Cited

U.S. PATENT DOCUMENTS

2015/0062819 A1    3/2015  Oughton, Jr. et al.
2015/0109708 A1    4/2015  Cheng
2015/0123473 A1    5/2015  Braylovskiy et al.
2015/0305197 A1*  10/2015  King .................... H05K 7/207
                                                        361/695

* cited by examiner

MULTI-INPUT LINE-REDUNDANT UNINTERRUPTABLE POWER SUPPLY

RELATED APPLICATION

Under provisions of 35 U.S.C. § 119(e), Applicants claim the benefit of U.S. provisional application No. 62/276,089, filed Jan. 7, 2016, which is incorporated herein by reference.

TECHNICAL FIELD

The present disclosure relates generally to power supplies.

BACKGROUND

A power supply is an electronic device that supplies electric energy to an electrical load. The primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices as well as commercial and industrial data and control systems.

Power supplies have a power input that receives energy from the energy source, and a power output that delivers energy to the load. In most power supplies, the power input and output consist of electrical connectors or hardwired circuit connections, though some power supplies employ wireless energy transfer in lieu of galvanic connections for the power input or output. Some power supplies have other types of inputs and outputs as well, for functions such as external monitoring and control.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
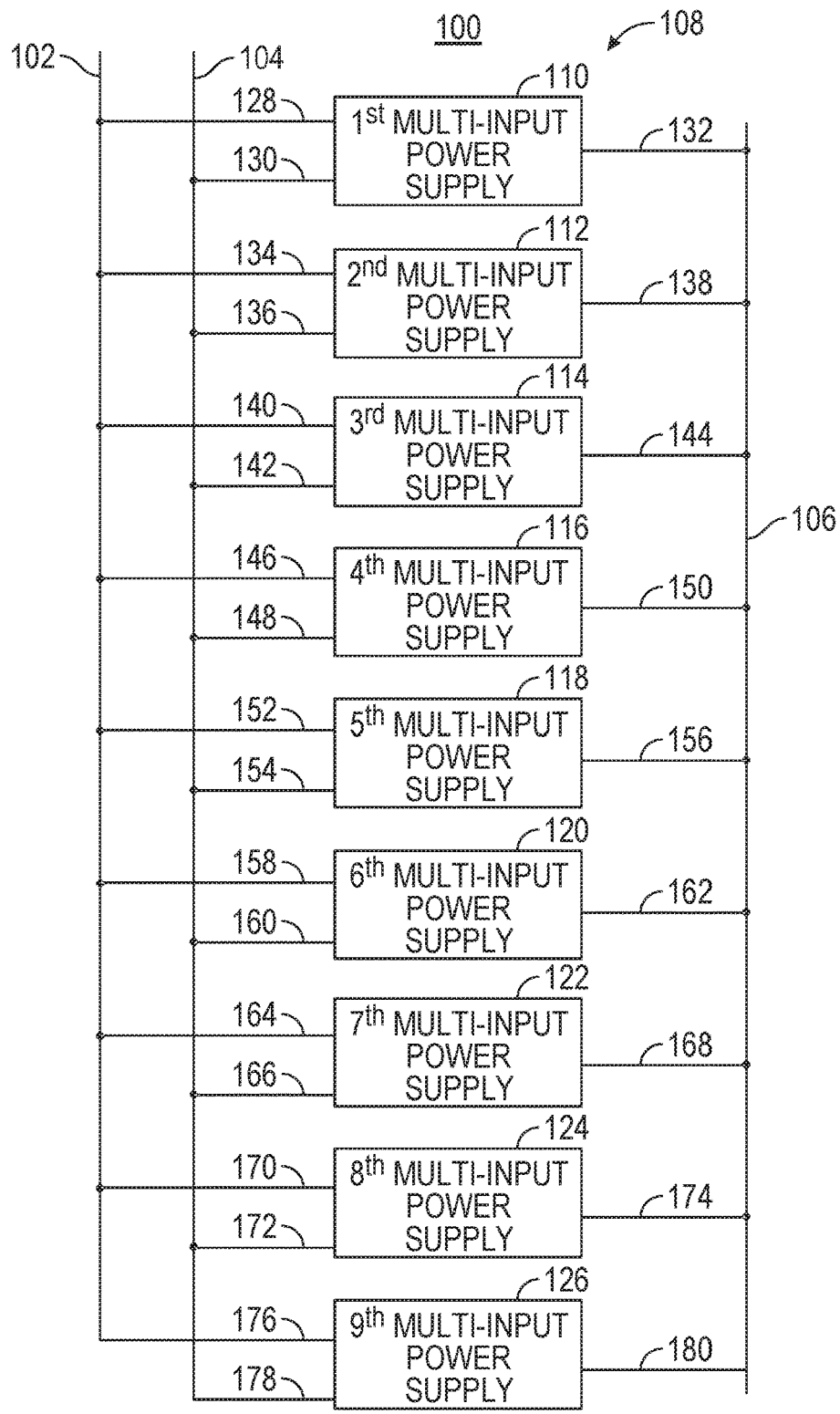
FIG. 1 is a block diagram of a power supply system with multiple redundant inputs.

A power supply system may be provided. The power supply system may comprise a plurality of input buses and an output bus. A plurality of multi-input power supplies may be disposed between the plurality of input buses and the output bus. The plurality of multi-input power supplies may be configured to supply a predetermined amount of power to the output bus before and after a failure event. The failure event may comprise at least one of the following: a failure of a one of the plurality of multi-input power supplies and loss of power on one of the plurality of input buses.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a power supply system with multiple power supplies that may be AC or DC input power and may be AC or DC output power, and not be limited to the application of Front-End Power (FEP) supplies or Board-Mounted Power (BMP) Supplies. The power supply system may comprise a plurality of input buses and an output bus. A plurality of multi-input power supplies may be disposed between the plurality of input buses and the output bus. The plurality of multi-input power supplies may be configured to supply a predetermined amount of power to the output bus before and after a failure event as an Uninterruptible Power Supply (UPS) of continuous output to the system. The failure event may comprise at least one of the following: a failure of a one of the plurality of multi-input power supplies and loss of power on one of the plurality of input power feed buses. The latter example is of a power line redundancy feed configuration with 2 inputs to a supply, one from an "A" bus power feed and one from a "B" bus power feed such as the N+N line redundancy where each "N" input line power can support the full output load.

In order to improve system availability, front-end power (FEP) supply examples are shown, but not limited to, alternating current (AC) to direct current (DC) rectifier and converters (i.e., power supplies) may be installed into systems in redundant configurations. Redundant Configurations allow for power failures without the loss of output power to the system maximum power requirement that many include, but are not limited to, N+1, N+M, and N+N. N is the quantity of power supplies required to meet the system maximum power, such as an example of 3 KW output from each power supply shared equally by 8 power supplies to support a 24 KW maximum system power requirement. The N+1 configuration may allow for a single power supply failure for power supply redundancy such as 9 3 KW power supplies for a 24 KW system requirement, or the N+M configuration may allow more than one power supply failure for power supply redundancy such as 10 3 KW power supplies for a 24 KW system requirement, or the N+N configuration may allow failure of half the power supplies such as 16 3 KW power supplies with to half of the power supplies fed from independent AC (or DC) input power feeds, such as A-Feed and B-Feed redundant buses, for power line redundancy and full redundancy. The N+N configuration may allow for the loss of an input feed and therefore half of the power supplies connected to the lost input feed or bus, or the loss of a power supply. However, one problem with the N+N configuration with single power input may be that the system requires twice as many power supplies as is necessary to support the system function. This may be costly in terms of money, space, and some energy that can be improved with a dual-input redundant-feed capability. Embodiments of the disclosure may provide a redundant power supply in a single unit with the loss of an input power line, as an Uninterruptible Power Supply (UPS). This may be provided with dual-input power from redundant power feeds. In this case each power supply may be an N+N power supply if connected to independent power feeds providing line redundancy if either input can support the full output power as with 2 inputs. Therefore N+N line redundancy can be provided with 8 power supplies with dual inputs from A and B redundant feeds for full system load, where 16 power supplies with single inputs are required for the same power line redundancy with half are on the A-feed and the other half on the B-feed. This case of a dual-input redundant-line power supply is N+N of input line quantities, as equivalent with the single-input N+N with power supply quantities. In another case a power supply with dual-input power from redundant power feeds may provide N+M power line redundancy at a lower output power than with a power line loss from one feed than from 2 feeds. This N+M case may be due to limitations of power from only one input power line, such as but not limited to, maximum input line current or maximum power cooling of the power supply with a single input, This case may be an advantage over a single input power supply in the example that only 75% of the output power is available from one input line, where 12 power supplies with dual-input redundant lines may provide line redundancy for full system load, that may require 16 power supplies with singe inputs. In this case of a dual-input redundant-line power suppply is N+M with input line quantities, as equivalent with the single-input N+M with power supply quantities without line redundancy of any kind.

FIG. 1 is a block diagram of a power supply system 100. As shown in FIG. 1, power supply system 100 may comprise a plurality of input buses (e.g., a first input bus 102 and a second input bus 104), an output bus 106, and a plurality of multi-input power supplies 108. Plurality of multi-input power supplies 108 may comprise a first multi-input power supply 110, a second multi-input power supply 112, a third multi-input power supply 114, a fourth multi-input power supply 116, a fifth multi-input power supply 118, a sixth multi-input power supply 120, a seventh multi-input power supply 122, an eighth multi-input power supply 124, and a ninth multi-input power supply 126. While FIG. 1 shows power supply system 100 as having two input buses, power supply system 100 may include any number of input buses and is not limited to two. Also, while FIG. 1 shows power supply system 100 as having nine multi-input power supplies, power supply system 100 may have any number of multi-input power supplies and is not limited to nine.

Each one of plurality of multi-input power supplies 108 may comprise a plurality of inputs and an output. For example, first multi-input power supply 110 may include a first multi-input power supply first input 128, a first multi-input power supply second input 130, and a first multi-input power supply output 132. Second multi-input power supply 112 may include a second multi-input power supply first input 134, a second multi-input power supply second input 136, and a second multi-input power supply output 138. Third multi-input power supply 114 may include a third multi-input power supply first input 140, a third multi-input power supply second input 142, and a third multi-input power supply output 144. Fourth multi-input power supply 116 may include a fourth multi-input power supply first input 146, a fourth multi-input power supply second input 148, and a fourth multi-input power supply output 150. Fifth multi-input power supply 118 may include a fifth multi-input power supply first input 152, a fifth multi-input power supply second input 154, and a fifth multi-input power supply output 156. Sixth multi-input power supply 120 may include a sixth multi-input power supply first input 158, a sixth multi-input power supply second input 160, and a sixth multi-input power supply output 162. Seventh multi-input power supply 122 may include a seventh multi-input power supply first input 164, a seventh multi-input power supply second input 166, and a seventh multi-input power supply output 168. Eighth multi-input power supply 124 may include an eighth multi-input power supply first input 170, an eighth multi-input power supply second input 172, and an eighth multi-input power supply output 174. And ninth multi-input power supply 126 may include a ninth multi-input power supply first input 176, a ninth multi-input power supply second input 178, and a ninth multi-input power supply output 180.

While FIG. 1 shows each one of plurality of multi-input power supplies 108 having two inputs, each one of plurality of multi-input power supplies 108 may have any number of inputs and is not limited to two. As shown in FIG. 1, first input bus 102 may supply power to first multi-input power supply first input 128, second multi-input power supply first input 134, third multi-input power supply first input 140, fourth multi-input power supply first input 146, fifth multi-input power supply first input 152, sixth multi-input power supply first input 158, seventh multi-input power supply first input 164, eighth multi-input power supply first input 170, and ninth multi-input power supply first input 176. Similarly, second input bus 104 may supply power to first multi-input power supply second input 130, second multi-input power supply second input 136, third multi-input power supply second input 142, fourth multi-input power supply second input 148, fifth multi-input power supply second input 154, sixth multi-input power supply second input 160, seventh multi-input power supply second input 166, eighth multi-input power supply second input 172, and ninth multi-input power supply second input 178.

Consistent with embodiments of the disclosure, plurality of multi-input power supplies 108 may be configured to supply a predetermined amount of power to output bus 106 before and after a failure event. The failure event may comprise, for example, a failure of a one of the plurality of multi-input power supplies 108 and/or loss of power on one of the plurality of input buses (e.g., first input bus 102 or second input bus 104).

Regarding the failure of a one of the plurality of multi-input power supplies 108, embodiments of the disclosure may provide N+1 redundancy. For example, plurality of multi-input power supplies 108 may be configured to supply X kW (e.g., 24 kW) of power to output bus 106. Each one of plurality of multi-input power supplies 108 may be configured to supply X/N kW (e.g., 3 kW) of power. As shown in the example of FIG. 1, each one of the nine (N+1) plurality of multi-input power supplies 108 may be configured to supply 3 kW of power to output bus 106. Accordingly, when all N+1 (e.g., nine) are working, each one of plurality of multi-input power supplies 108 may supply approximately X/(N+1) (e.g., 2.7 kW) of power to output bus 106 to supply X kW (e.g., 24 kW) to output bus 106. When one of plurality of multi-input power supplies 108 fails, each one of the remaining plurality of multi-input power supplies 108 may supply its full X/N kW (e.g., 3 kW) of power to output bus 106 in order to supply X kW (e.g., 24 kW) to output bus 106 to make up for the loss of the failed one of plurality of multi-input power supplies 108 thus providing N+1 redundancy.

Figure 2:
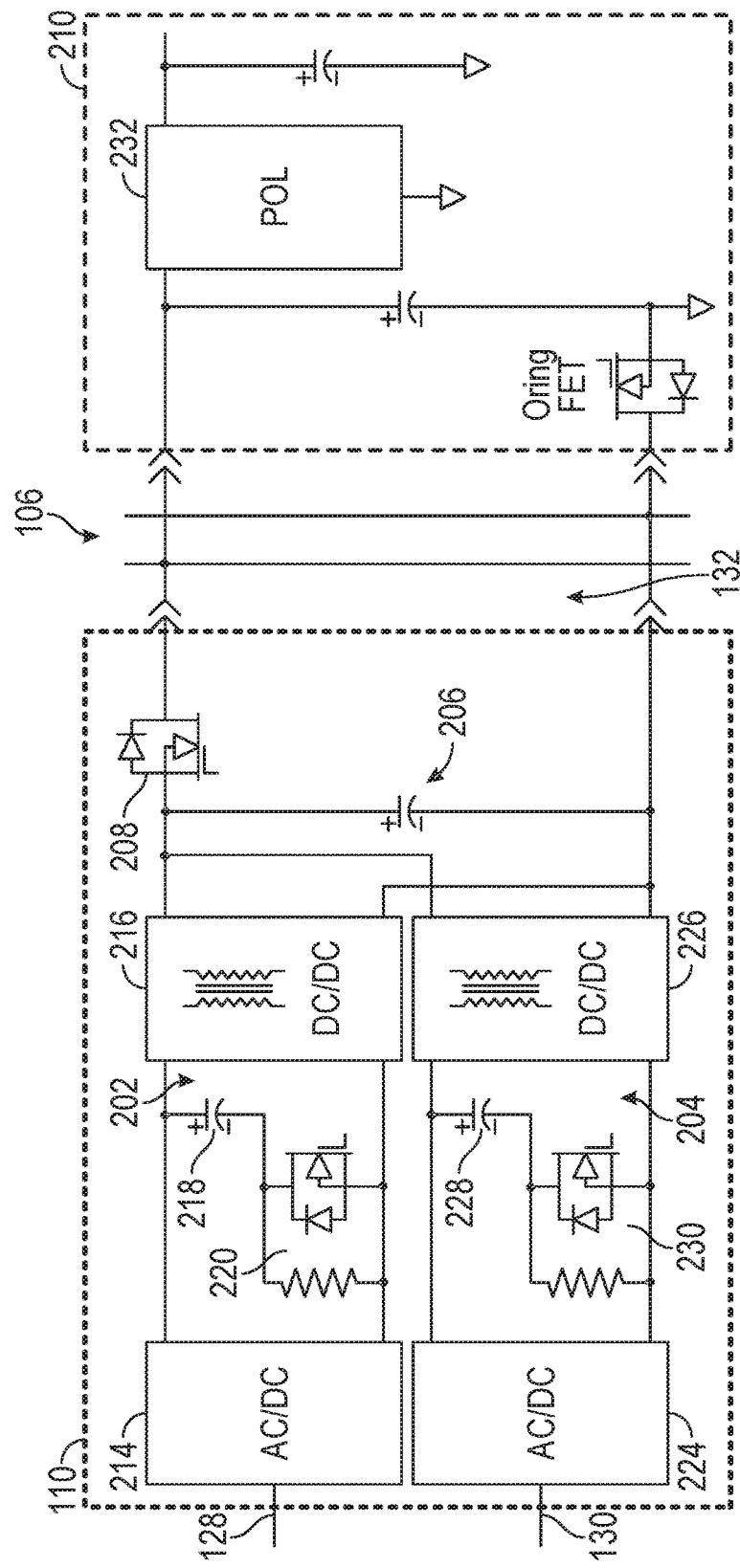
FIG. 2 is a block diagram of a multi-input redundant power supply having two sections.

FIG. 2 is a block diagram of first multi-input power supply 110 having two sections. The embodiment of first multi-input power supply 110 shown in FIG. 2 may comprise an example of any one of plurality of multi-input power supplies 108. As shown in FIG. 2, first multi-input power supply 110 may comprise a first section 202, a second section 204, an output filter capacitor 206, and a first multi-input power supply ORing-diode field-effect transistor (FET) 208. A load 210 may be connected to output bus 106. Load 210 may include a point of load (POL) 232. ORing-diode field-effect transistor (FET) 208 may serve as a protection device in power supply system 100 and take first multi-input power supply 110 off-line during a fault condition.

First section 202 may comprise a first section first stage 214, a first section second stage 216, a first section hold-up capacitor 218, and a first section soft-start circuit 220. Similarly, second section 204 may comprise a second section first stage 224, a second section second stage 226, a second section hold-up capacitor 228, and a second section soft-start circuit 230.

First section first stage 214 may comprise an alternating current (AC) to direct current (DC) rectifier and converter. First section second stage 216 may comprises a direct current (DC) to direct current (DC) converter and isolation transformer. First section soft-start circuit 220 may function as an inrush current limiter to limit the maximum current into downstream elements. Similarly, second section first stage 224 may comprise an alternating current (AC) to direct current (DC) rectifier and converter. Second section second stage 226 may comprises a direct current (DC) to direct current (DC) converter and isolation transformer. Second section soft-start circuit 230 may function as an inrush current limiter to limit the maximum current into downstream elements.

Consistent with embodiments of the disclosure, first multi-input power supply 110 may provide a predetermined "ride-through" time during which first multi-input power supply 110 may supply power to first multi-input power supply output 132 even after power is lost on all inputs (e.g., first multi-input power supply first input 128 and first multi-input power supply second input 130). This ride-through power may be supplied by first section hold-up capacitor 218 and second section hold-up capacitor 228. Consistent with embodiments of the disclosure, the ride-through time may be a function of the sum of the capacitance of first section hold-up capacitor 218 and second section hold-up capacitor 228. Accordingly, the capacitance needed for the predetermined ride-through time may be divided (e.g., equally) between first section hold-up capacitor 218 and second section hold-up capacitor 228. Consequently, cost and space may be saved by sharing this capacitance between the sections. In other words, neither section needs to supply the entire ride-through for first multi-input power supply 110. Rather this may be shared between sections of first multi-input power supply 110.

Consistent with embodiments of the disclosure, first multi-input power supply first input 128 may be connected to first input bus 102. Similarly, first multi-input power supply second input 130 may be connected to second input bus 104. As such, first input bus 102 may supply power to first section 202 and second input bus 104 may supply power to second section 204. First section 202 and second section 204 may be redundant because either one of first section 202 and second section 204 may alone supply the full amount of power expected from first multi-input power supply 110. For example, the full amount of power expected from first multi-input power supply 110 may comprise 3 kW of power (e.g., X/N from the above example). Accordingly, first section 202 may be configured to supply 3 kW of power and second section 204 may be configured to supply 3 kW of power. Consequently, if power is preset on first multi-input power supply second input 130 and power is lost on first multi-input power supply first input 128, then second section 204 may alone supply the full amount of power (e.g., 3 kW) expected from first multi-input power supply 110. Similarly, if power is preset on first multi-input power supply first input 128 and power is lost on first multi-input power supply second input 130, then first section 202 may alone supply the full amount of power (e.g., 3 kW) expected from first multi-input power supply 110. When power is preset on both first multi-input power supply first input 128 and first multi-input power supply second input 130, then first section 202 may supply half the full amount of power expected from first multi-input power supply 110 (e.g., 1.5 kW) and second section 204 may supply half the full amount of power expected from first multi-input power supply 110 (e.g., 1.5 kW). The advantages of the dual-input redundant power buses to isolated dual power sections are, but not limited to, shared input current from both input buses during normal operation from both inputs plus fast and reliable transfer of full power to the remaining line with a line-loss failure that are not possible with the automatic transfer switch (ATS) power supply design approach.

Referring back to FIG. 1, the embodiment of first multi-input power supply 110 shown in FIG. 2 may comprise each one of plurality of multi-input power supplies 108. For example, plurality of multi-input power supplies 108 may be configured to supply X kW (e.g., 24 kW) of power to output bus 106. Each one of plurality of multi-input power supplies 108 may be configured to supply X/N kW (e.g., 3 kW) of power. As shown in the example of FIG. 1, each one of the nine (N+1) plurality of multi-input power supplies 108 may be configured to supply 3 kW of power to output bus 106. Accordingly, when all nine are working, each one of plurality of multi-input power supplies 108 may supply approximately X/(N+1) (e.g., 2.7 kW) of power to output bus 106 to supply X kW (e.g., 24 kW) to output bus 106. Furthermore, first section 202 and second section 204 of each one of plurality of multi-input power supplies 108 may be redundant because either one of first section 202 and second section 204 may alone supply the full amount of power expected from each one of plurality of multi-input power supplies 108. Accordingly, first section 202 may be configured to supply X/N kW (e.g., 3 kW) of power and second section 204 may be configured to supply X/N kW (e.g., 3 kW) of power.

In this example, when all N+1 (e.g., nine) are working, each one of plurality of multi-input power supplies 108 may supply approximately X/(N+1) (e.g., 2.7 kW) of power to output bus 106 to supply X kW (e.g., 24 kW) to output bus 106. Furthermore, each section of each one of plurality of multi-input power supplies 108 may supply half of the corresponding multi-input power supply's power. For example, first section 202 may supply (X/N)/2 kW (e.g., 1.35 kW) of power and second section 204 may supply (X/N)/2 kW (e.g., 1.35 kW) of power.

If power is lost on first bus 102, second section 204 of each one of plurality of multi-input power supplies 108 with make up for the shortfall caused by the loss of power on first bus 102. In this example, second section 204 of each one of plurality of multi-input power supplies 108 may supply (X/N+1) kW (e.g., 2.7 kW) of power. In addition, when one of plurality of multi-input power supplies 108 fails during a power loss on first bus 102, each one of the remaining plurality of multi-input power supplies 108 may supply its full X/N kW (e.g., 3 kW) of power to output bus 106 from its second section 204 in order to supply X kW (e.g., 24 kW) to output bus 106 to make up for the loss of the failed one of plurality of multi-input power supplies 108. Thus embodiments of the disclosure may provide N+1 redundancy when power is lost on first bus 102 and when one of multi-input power supplies 108 has failed.

Furthermore, if power is lost on second bus 104, first section 202 of each one of plurality of multi-input power supplies 108 with make up for the shortfall caused by the loss of power on second bus 104. In this example, first section 202 of each one of plurality of multi-input power supplies 108 may supply (X/N+1) kW (e.g., 2.7 kW) of power. In addition, when one of plurality of multi-input power supplies 108 fails during power loss on second bus 104, each one of the remaining plurality of multi-input power supplies 108 may supply its full X/N kW (e.g., 3 kW) of power to output bus 106 from its first section 202 in order to supply X kW (e.g., 24 kW) to output bus 106 to make up for the loss of the failed one of plurality of multi-input power supplies 108. Thus embodiments of the disclosure may provide N+1 redundancy when power is lost on second bus 104 and when one of multi-input power supplies 108 has failed.

Figure 3:
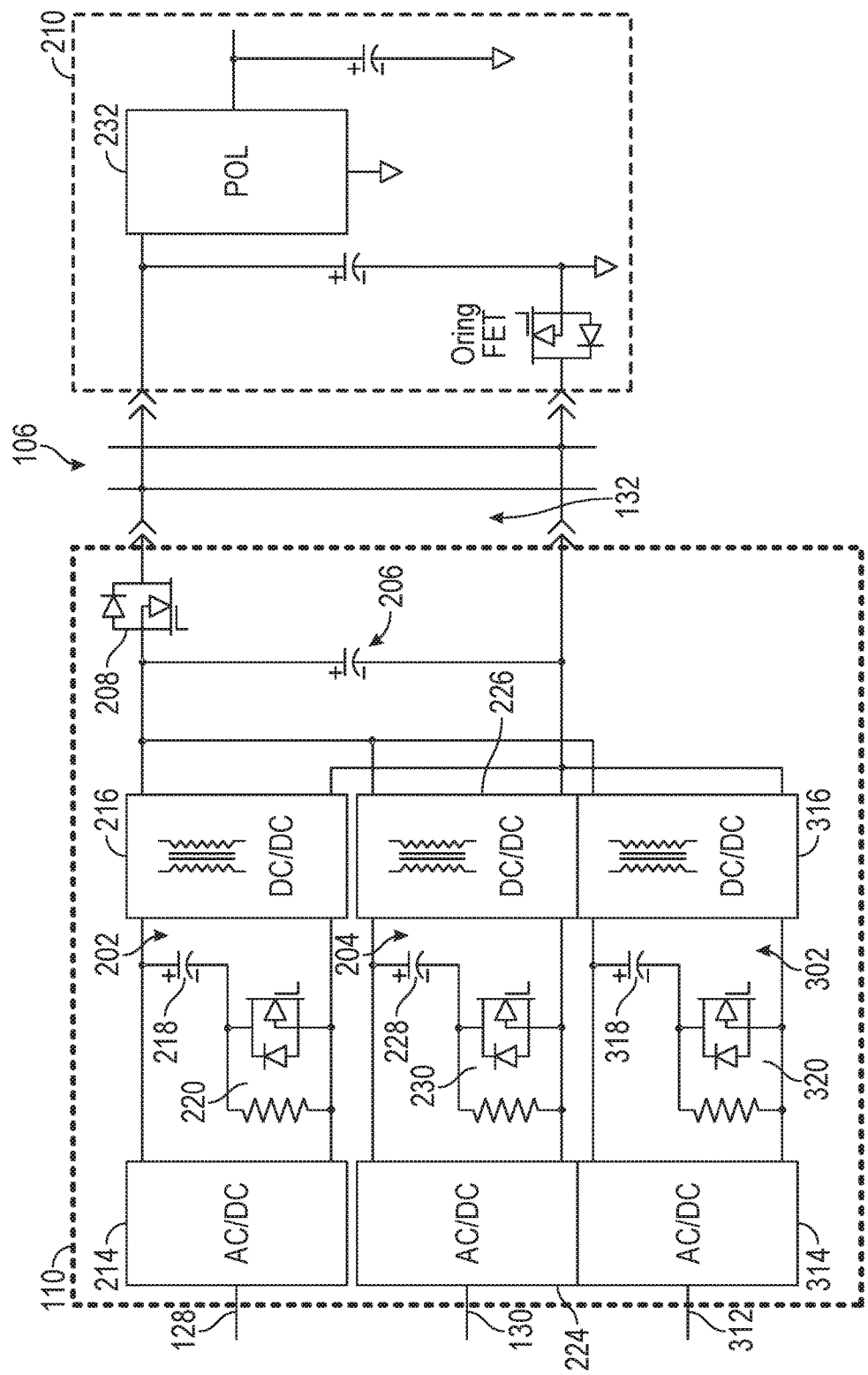
FIG. 3 is a block diagram of a multi-input redundant power supply having three sections.
Figure 4A:
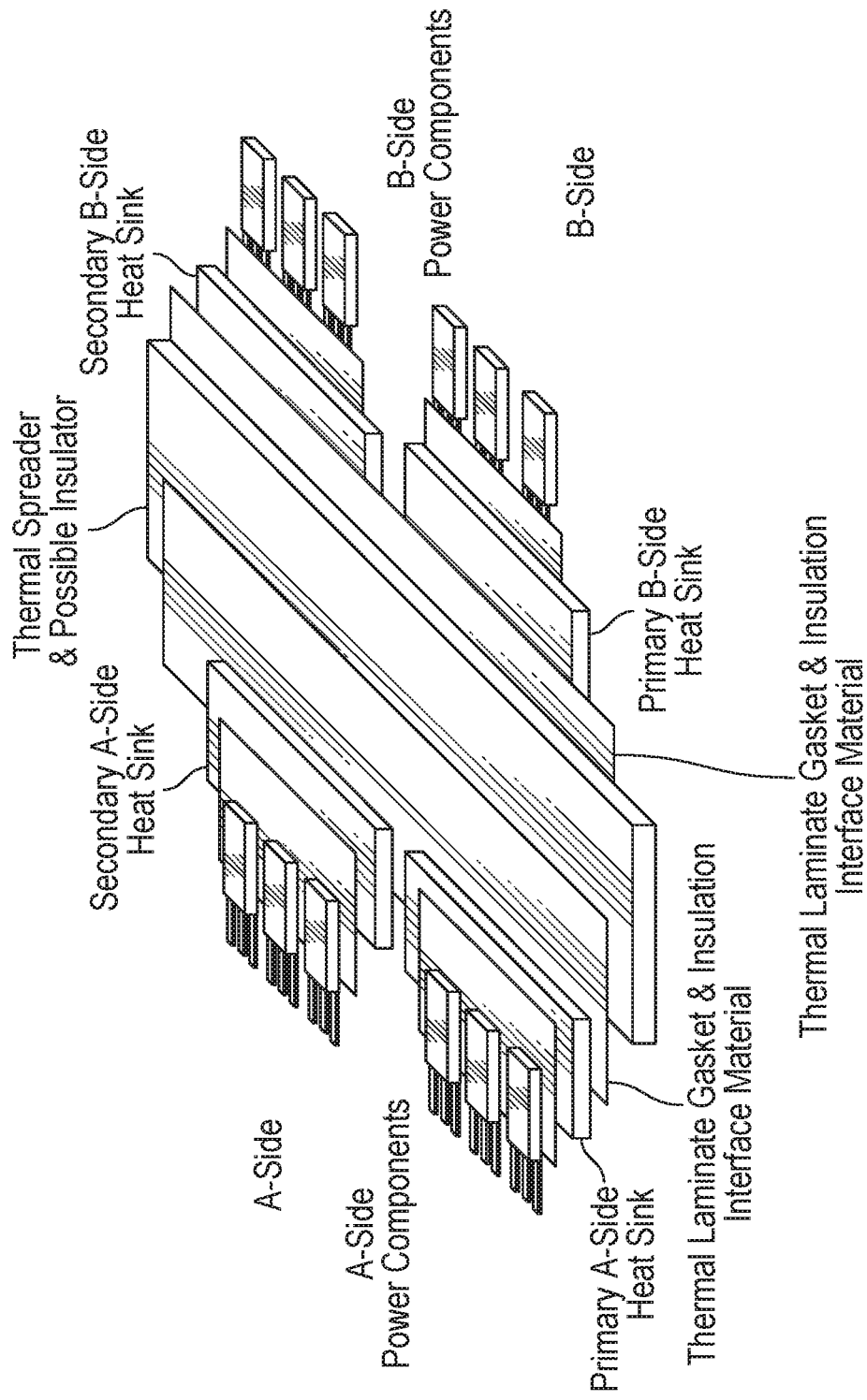
FIG. 4A shows a common thermal spreader between heatsinks.
Figure 4B:
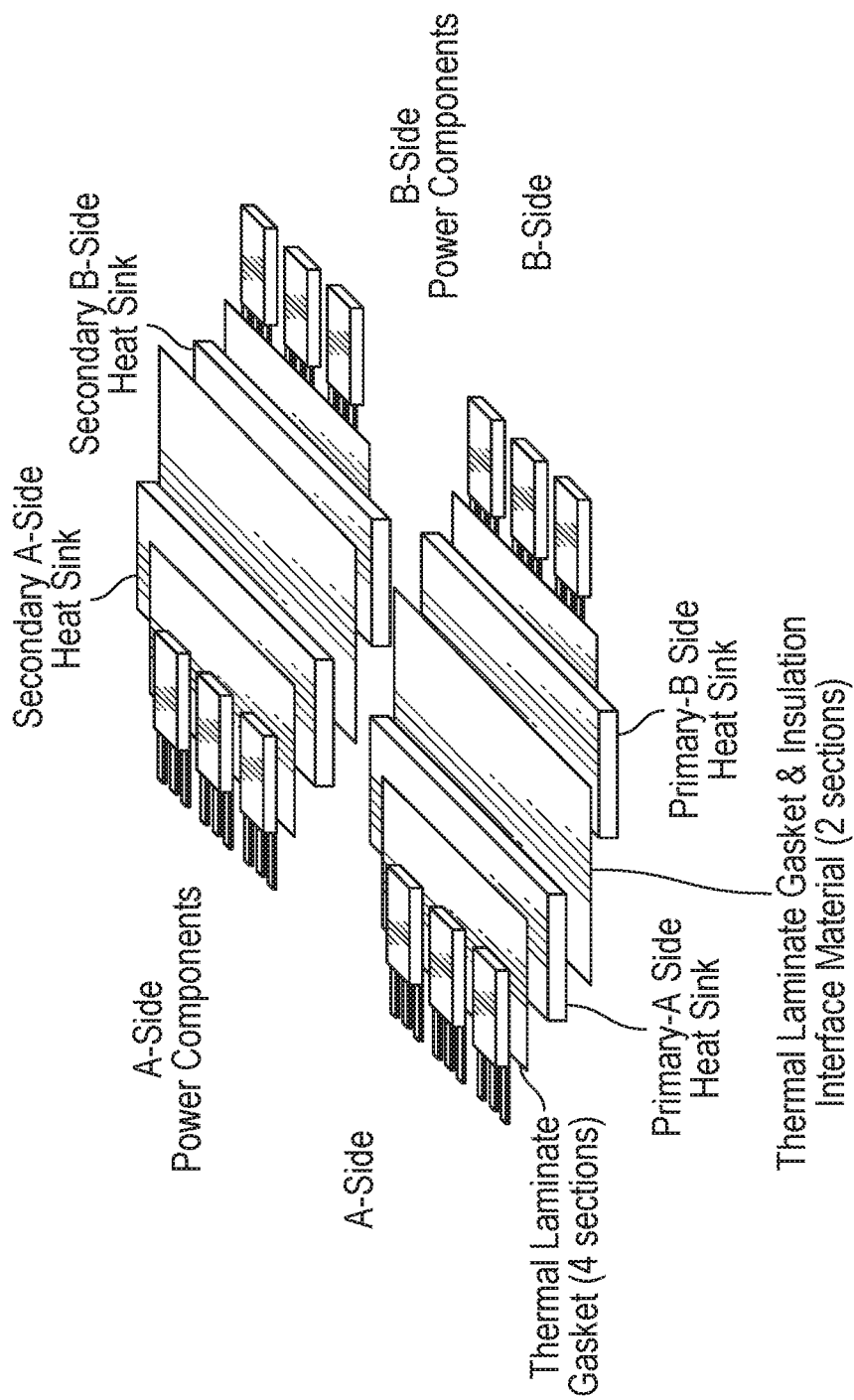
FIG. 4B shows a common thermal spreader between heatsinks.
Figure 5:
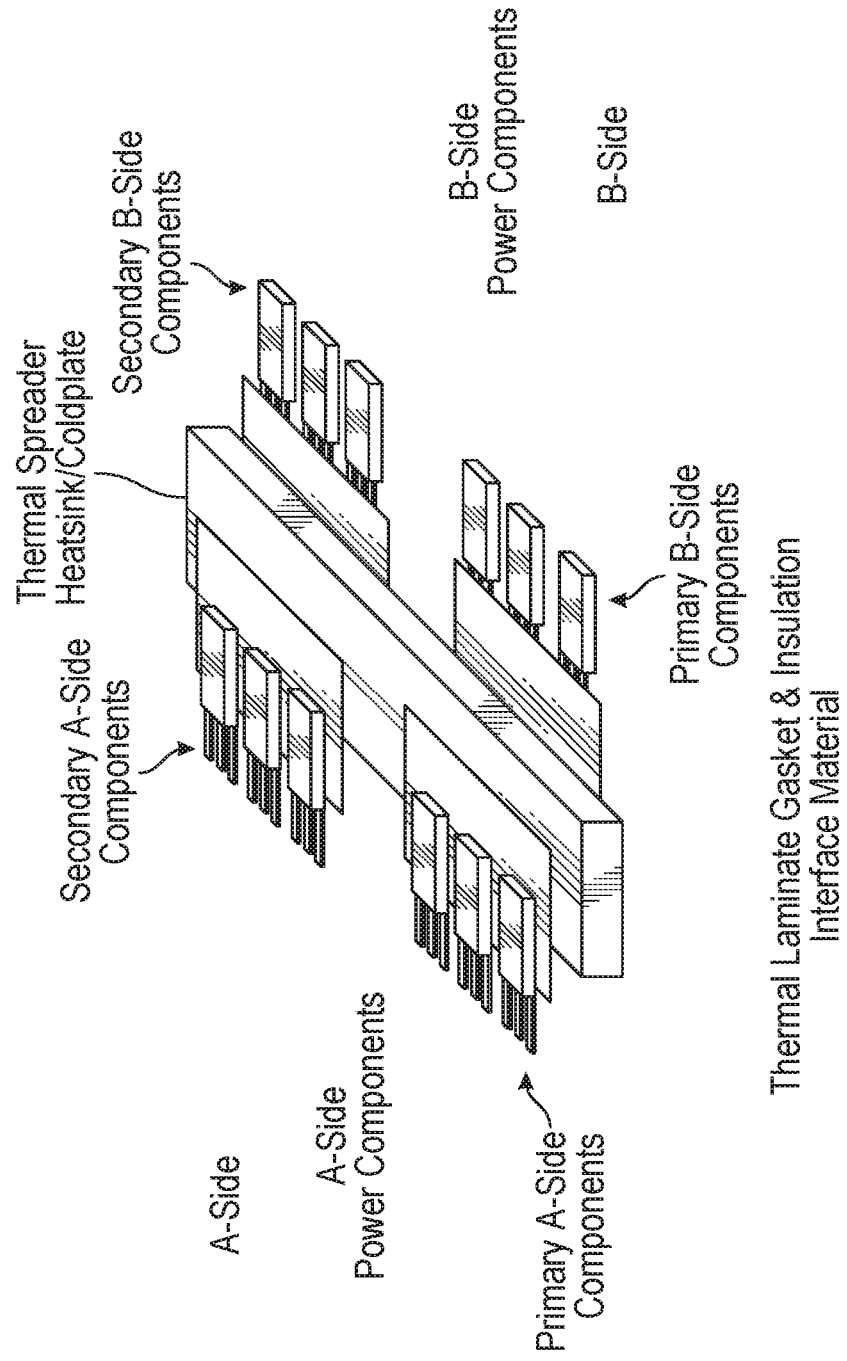
FIG. 5 shows a common heatsink.
Figure 6:
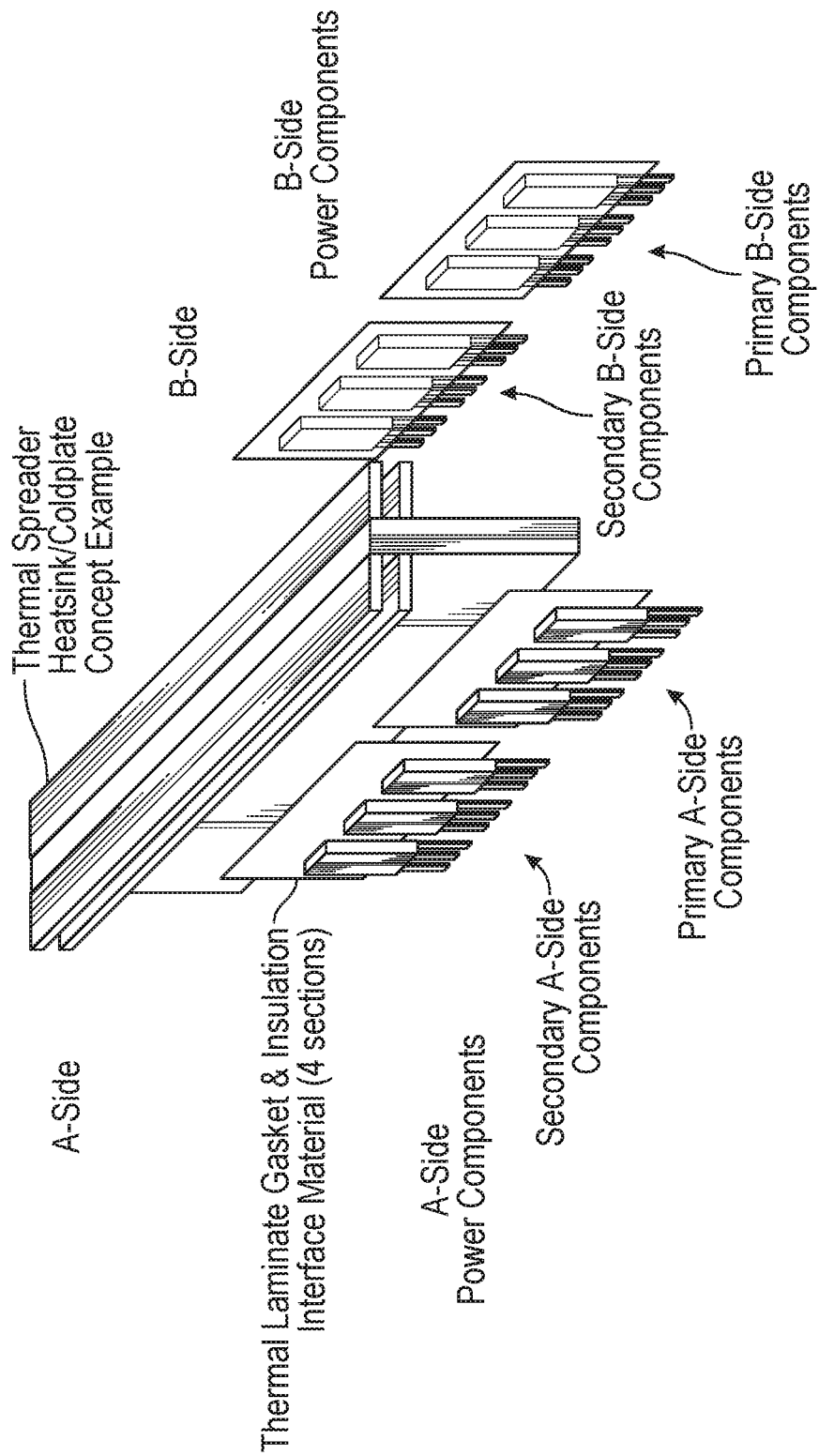
FIG. 6 shows a common heatsink.

FIG. 3 is a block diagram of first multi-input power supply 110 having three sections rather than the two sections shown in FIG. 2. The embodiments of first multi-input power supply 110 shown in FIG. 3 may comprise an example of any one of plurality of multi-input power supplies 108. As shown in FIG. 3, in addition to first section 202 and second section 204 as described above with respect to FIG. 2, the embodiments of first multi-input power supply 110 shown in FIG. 3 may include a third section 302 connected to a first multi-input power supply third input 312. Third section 302 may include a third section first stage 314, a third section second stage 316, a third section hold-up capacitor 318, and a third section soft-start circuit 320. First multi-input power supply third input 312 may be connected to a third input bus.

Consistent with embodiments of the disclosure, first multi-input power supply first input 128 may be connected to first input bus 102. Similarly, first multi-input power supply second input 130 may be connected to second input bus 104. And third section input 312 may be connected to a third input bus. As such, first input bus 102 may supply power to first section 202, second input bus 104 may supply power to second section 204, and the third input bus may supply power to third section 302. First section 202, second section 204, and third section 302 may provide redundancy because two of the three sections may supply the full amount of power expected from first multi-input power supply 110. For example, the full amount of power expected from first multi-input power supply 110 may comprise 3 kW of power (e.g., X/N from the above example). Accordingly, first section 202 may be configured to supply 1.5 kW (e.g., 1/2*X/N) of power, second section 204 may be configured to supply 1.5 kW (e.g., 1/2*X/N) of power, and third section 302 may be configured to supply 1.5 kW (e.g., 1/2*X/N) of power. Consequently, if power is preset on any two of first multi-input power supply first input 128, first multi-input power supply second input 130, and first multi-input power supply third input 312, but lost on one of first multi-input power supply first input 128, first multi-input power supply second input 130, and first multi-input power supply third input 312, then the two sections that have power may supply the full amount of power (e.g., 3 kW) expected from first multi-input power supply 110. When power is preset on all of first multi-input power supply first input 128, first multi-input power supply second input 130, and first multi-input power supply third input 312, then first section 202 may supply one-third the full amount of power expected from first multi-input power supply 110 (e.g., 1 kW), second section 204 may supply one-third the full amount of power expected from first multi-input power supply 110 (e.g., 1 kW), and third section 302 may supply one-third the full amount of power expected from first multi-input power supply 110 (e.g., 1 kW).

The example of first multi-input power supply 110 shown in FIG. 3 may be used for all of plurality of multi-input power supplies 108 shown in FIG. 1. Thus, consistent with the above example, embodiments of the disclosure where first multi-input power supply 110 has three sections may also provide N+1 redundancy when one of multi-input power supplies 108 has failed and power is preset on any two of first multi-input power supply first input 128, first multi-input power supply second input 130, and first multi-input power supply third input 312, but lost on one of first multi-input power supply first input 128, first multi-input power supply second input 130, and first multi-input power supply third input 312.

As described above with respect to FIG. 2, first multi-input power supply 110 of FIG. 3 may provide a predetermined "ride-through" time during which first multi-input power supply 110 may supply power to first multi-input power supply output 132 even after power is lost on all inputs (e.g., first multi-input power supply first input 128, first multi-input power supply second input 130, and first multi-input power supply third input 312). This ride-through power may be supplied by first section hold-up capacitor 218, second section hold-up capacitor 228, and third section hold-up capacitor 318. Consistent with embodiments of the disclosure, the ride-through time may be a function of the sum of the capacitance of first section hold-up capacitor 218, second section hold-up capacitor 228, and third section hold-up capacitor 318. Accordingly, the capacitance needed for the predetermined ride-through time may be divided (e.g., equally) between first section hold-up capacitor 218, second section hold-up capacitor 228, and third section hold-up capacitor 318. Consequently, cost and space may be saved by sharing this capacitance between the sections. In other words, none of the sections need to supply the entire ride-through for first multi-input power supply 110. Rather this may be shared between sections of first multi-input power supply 110.

Consistent with embodiments of the disclosure, a common heatsink and heat spreader may be used between the sections (e.g., first section 202, second section 204, and third section 302) of first multi-input power supply 110. As shown in FIG. 4 through FIG. 9, first section 202 may be referred to as the A-side, second section 204 may be referred to as the B-side, and third section 302 may be referred to as the C-side.

Figure 7:
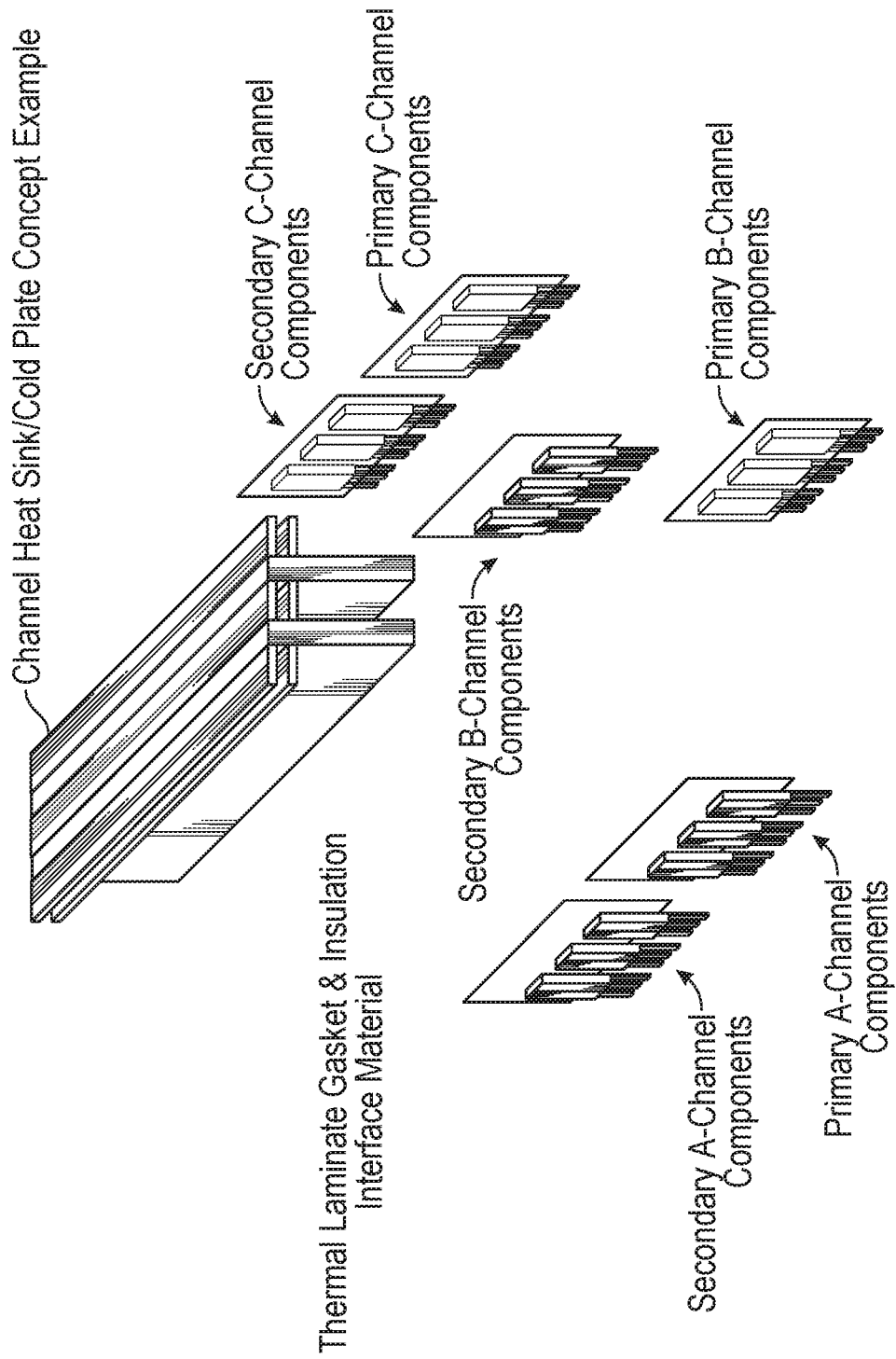
FIG. 7 shows a common heatsink.

FIG. 4A, FIG. 4B, FIG. 5, and FIG. 6 show a common heatsink that may be used in the embodiment of first multi-input power supply 110 shown in FIG. 2 using two sections. The heatsinks, for example, may have fins on top in opposite directions into the air flow of the individual side so as not interfere with each other. FIG. 7 shows a common heatsink that may be used in the embodiment of first multi-input power supply 110 shown in FIG. 3 using three section. Embodiments of the common heatsink may be effective by utilizing most of first multi-input power supply 110's internal volume in the air flow area, thereby reducing the effective or virtual power density for more effective cooling. For example, first multi-input power supply 110 may have the size of 1.575"H×5.1"W×15.7"D=125.7 in$^3$. With 3 kW output from first section 202 and second section 204 (i.e., 1.5 kW each), the power density may be 23.86 W/in$^3$. But when first input bus 102 or second input bus 104 is lost, only one section at 3 kW in ½ the width and area may increase the equivalent or effective power density to twice or 47.7 W/in$^3$. In order to cool this, embodiments of the disclosure may use more of the wasted space in first multi-input power supply 110 with a common cooling area for either side's power channel (i.e., section). Accordingly, embodiments of the disclosure may use a custom common heatsink design with fins that may cover or utilize the whole width of first multi-input power supply 110's air flow area as well as the height and length for example. This may allow for different ambient temperature requirements for normal and abnormal input conditions for reduced design requirements of both sections, i.e., 55 C normal dual input at 50% FL/channel, 40 C abnormal single input 100% FL/channel.

Figure 8:
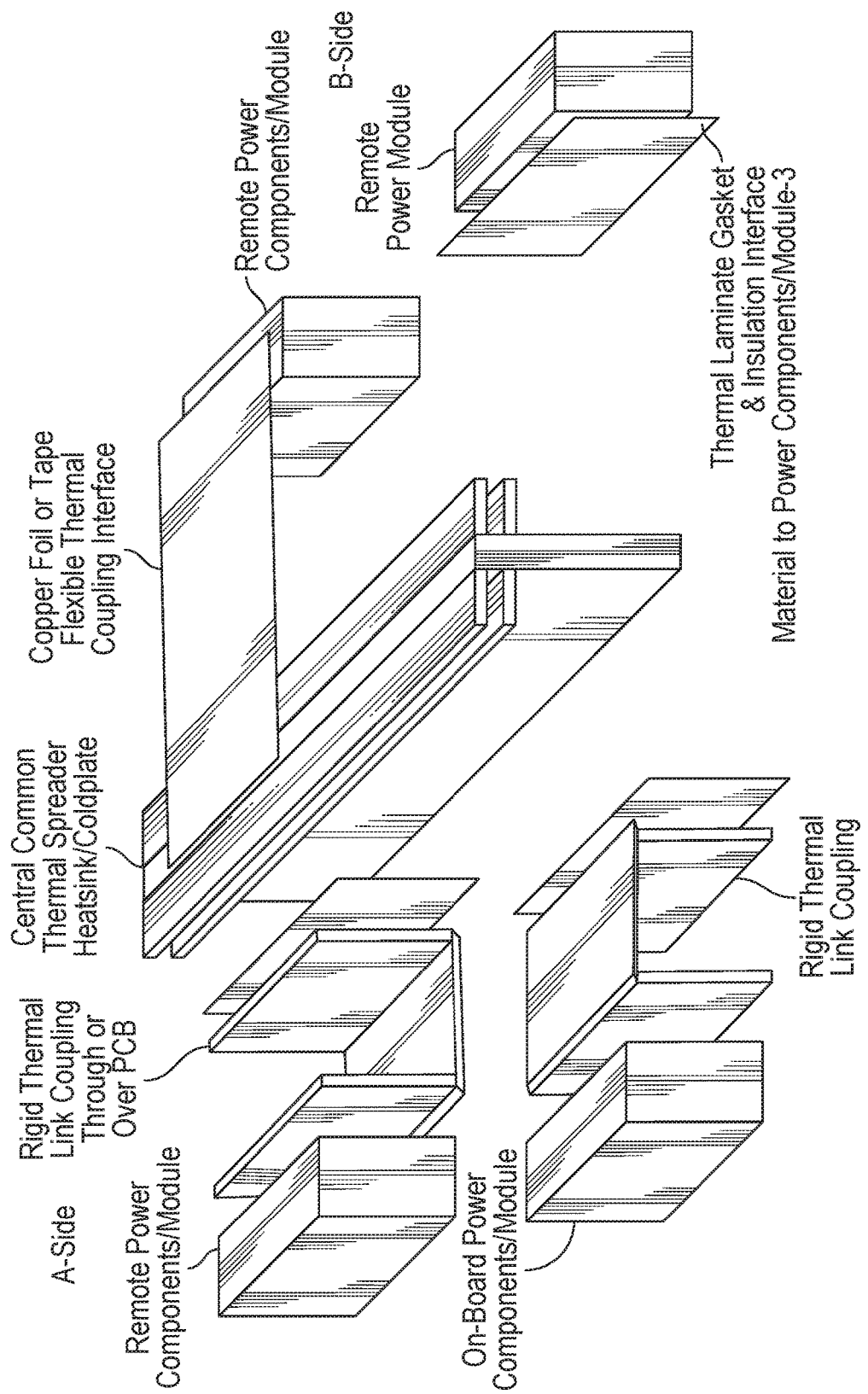
FIG. 8 shows thermal linking to a common heatsink.

Consistent with embodiments of the disclosure, the common heatsink/spreader may be split into sections for ease of assembly with each of the stages of the sections. As shown in FIG. 8, remote modules, components, and heatsinks may be thermally linked to the common heat sink(s) with a thermally conductive interface material or heat spreader such as tape, foil, plates, or sheets. Electrical insulation may be added between the heatsinks and the power sections with thermally conductive and electrical insulator materials such as or similar to Bergquist Bond-Ply. FIG. 8 shows, for example, thermal linkages from remote or outboard power components and modules to a main or major heat sink on any power devise to cool. It may be for any remote or outboard power components and modules on any side of a multiple power channel using a common thermal cooling channel or heatsink. Example embodiments may use: i) PCB or board-mounted thermal spreader or heat sinking linkage to get between a remote power component or module to the common heatsink; ii) a rigid heatsinking linkage to get between a remote power component or module to the common heatsink; iii) attach a remote power component or module directly to the common heatsink; or iv) use a flexible thermal spreader or heat sinking linkage such as copper foil or tape to get between a remote power component or module to the common heatsink.

Figure 9:
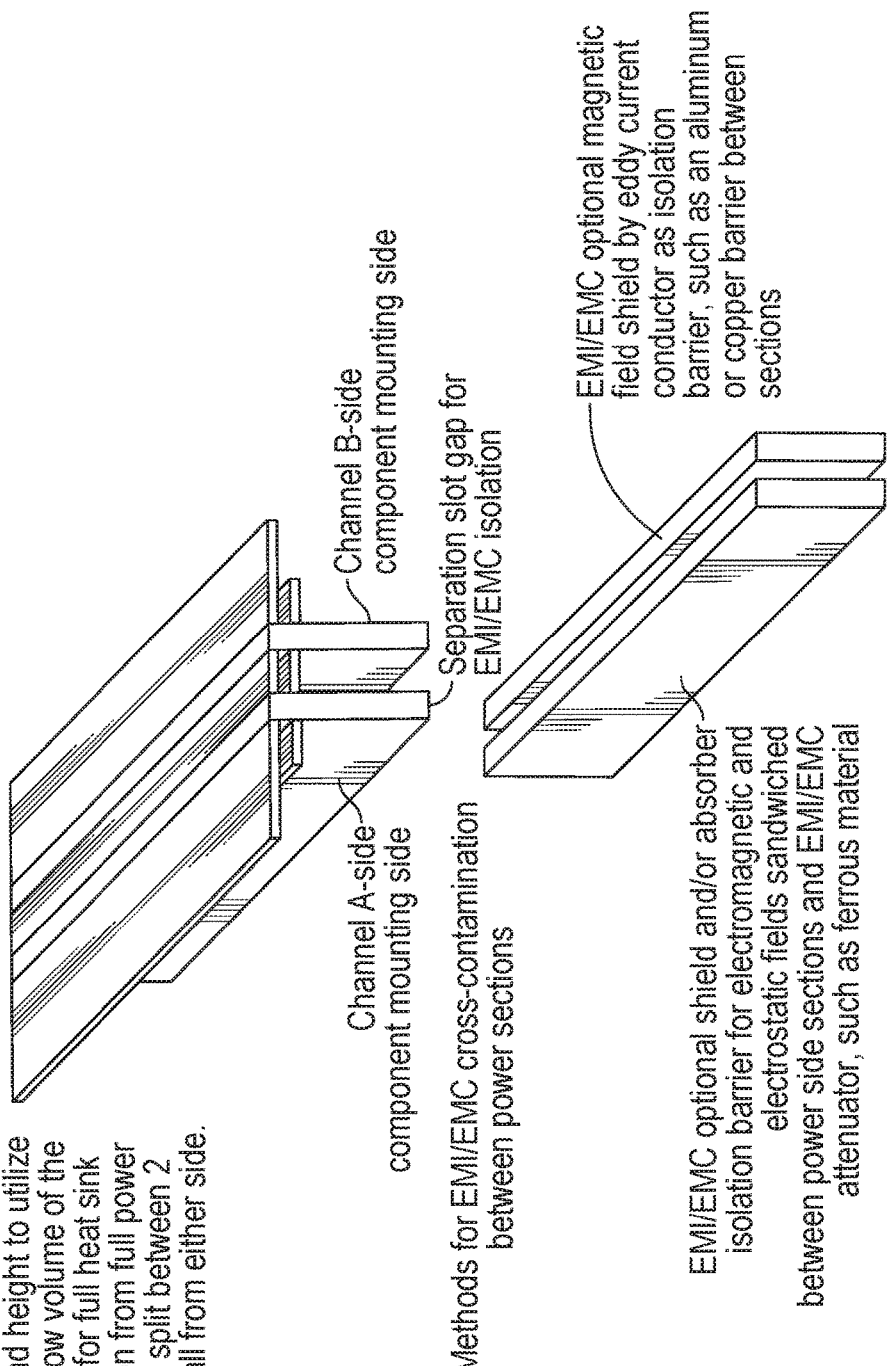
FIG. 9 shows a common heatsink with an EMI/EMC isolation barrier.
Figure 10:
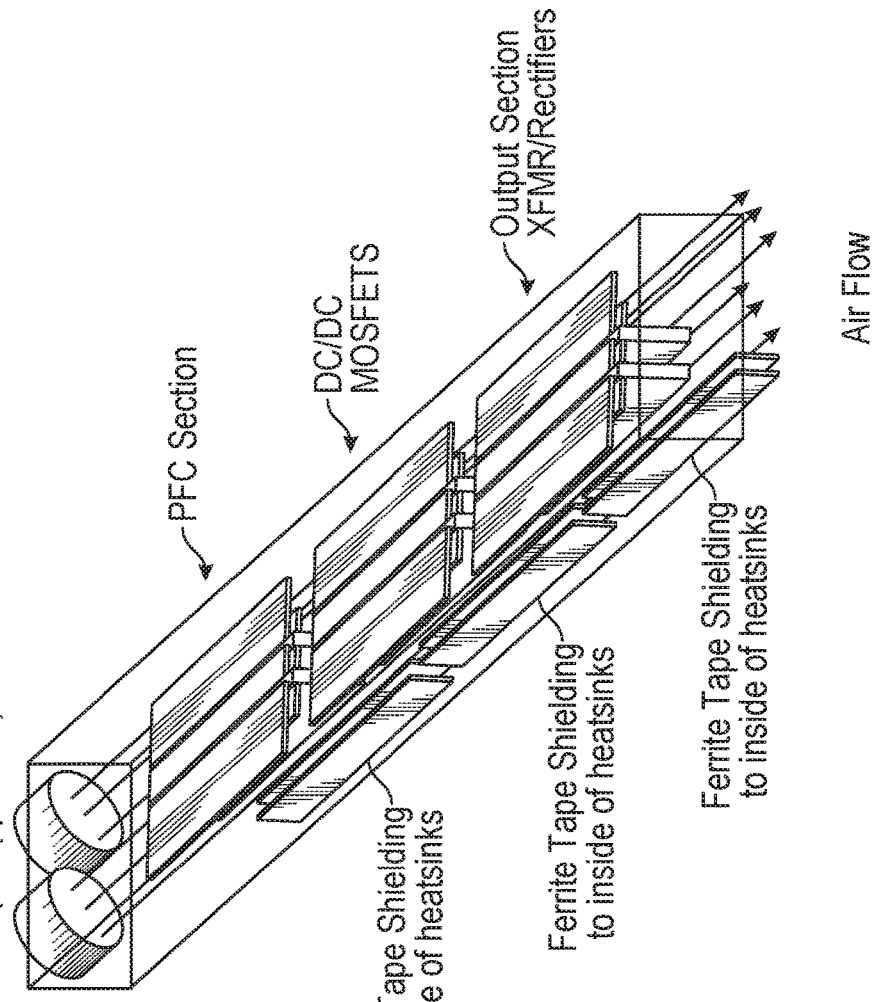
FIG. 10 shows a common heatsink split into sections of a front-end AC or DC power supply with forced air flow.

FIG. 9 shows a common heatsink with an EMI/EMC isolation barrier and/or absorber material added between the sections to mitigate electromagnetic and electrostatic cross contamination. This may be a separate eddy-current type shield or a ferrous barrier, tape, or plating. FIG. 10 shows a common heatsink split into section with forced air flow.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
a plurality of input buses;
an output bus; and
a plurality of multi-input power supplies, wherein each of the plurality of multi-input power supplies is connected to the plurality of input buses, wherein each of the plurality of the multi-input power supplies is connected to the output bus, the plurality of multi-input power supplies being configured to supply a predetermined amount of power to the output bus before and after a failure event comprising at least one of the following: a failure of a one of the plurality of multi-input power supplies and loss of power on one of the plurality of input buses, wherein the apparatus is configured to provide the predetermined amount of power to the output bus when power is lost on each of the plurality of input buses for a predetermined ride-through time, and wherein the ride-through time is function of a sum of a plurality of hold-up capacitors disposed in the plurality of multi-input power supplies.

2. The apparatus of claim 1, wherein each of the plurality of multi-input power supplies comprises a plurality of sections, each one of the plurality of input buses being respectively connected to a different one of the plurality of sections.

3. The apparatus of claim 2, wherein each of the plurality of sections comprises a first stage comprising an alternating current (AC) to direct current (DC) rectifier and converter.

4. The apparatus of claim 3, wherein each of the plurality of sections comprises a second stage comprising a direct current (DC) to direct current (DC) converter and isolation transformer.

5. The apparatus of claim 4, wherein each of the plurality of sections comprises a hold-up capacitor.

6. The apparatus of claim 5, wherein the hold-up capacitor is disposed between the first stage and the second stage.

7. An apparatus comprising:
a plurality of inputs;
an output; and
a plurality of sections, each one of the plurality of inputs being respectively connected to each one of the plurality of sections, the apparatus being configured to supply a predetermined amount of power to the output before and after a failure event comprising loss of power on one of the plurality of inputs, wherein the apparatus is configured to provide the predetermined amount of power to the output when power is lost on each of the plurality of inputs for a predetermined ride-through time, and wherein the ride-through time is function of a sum of a plurality of hold-up capacitors disposed in the plurality of sections.

8. The apparatus of claim 7, wherein each of the plurality of sections comprises a first stage.

9. The apparatus of claim 8, wherein the first stage comprises an alternating current (AC) to direct current (DC) rectifier and converter.

10. The apparatus of claim 9, wherein each of the plurality of sections comprises a second stage.

11. The apparatus of claim 10, wherein the second stage comprises a direct current (DC) to direct current (DC) converter and isolation transformer.

12. The apparatus of claim 11, wherein each of the plurality of sections comprises a hold-up capacitor.

13. The apparatus of claim 12, wherein the hold-up capacitor is disposed between the first stage and the second stage.

14. The apparatus of claim 7, wherein the plurality of sections share a common heat sink.

15. The apparatus of claim 7, further comprising an output filter capacitor.

16. The apparatus of claim 7, further comprising a multi-input power supply with ORing-diode field-effect transistor (FET).

17. An apparatus comprising:
a plurality of inputs;
an output;
a plurality of sections, each one of the plurality of inputs being respectively connected to each one of the plurality of sections, the apparatus being configured to supply a predetermined amount of power to the output through the plurality of sections, wherein the apparatus is configured to provide the predetermined amount of power to the output when power is lost on each of the plurality of inputs for a predetermined ride-through time; and
a plurality of hold-up capacitors respectively disposed in each of the plurality of sections, wherein the ride-through time is a function of a sum of a capacitance of each of the plurality of hold-up capacitors.

18. The apparatus of claim 17, wherein the apparatus is configured to supply a predetermined amount of power to the output before and after a failure event comprising loss of power on one of the plurality of inputs.

19. The apparatus of claim 17, wherein the plurality of sections share a common heat sink.

20. The apparatus of claim 17, further comprising a multi-input power supply with ORing-diode field-effect transistor (FET).

* * * * *